Figure 1:
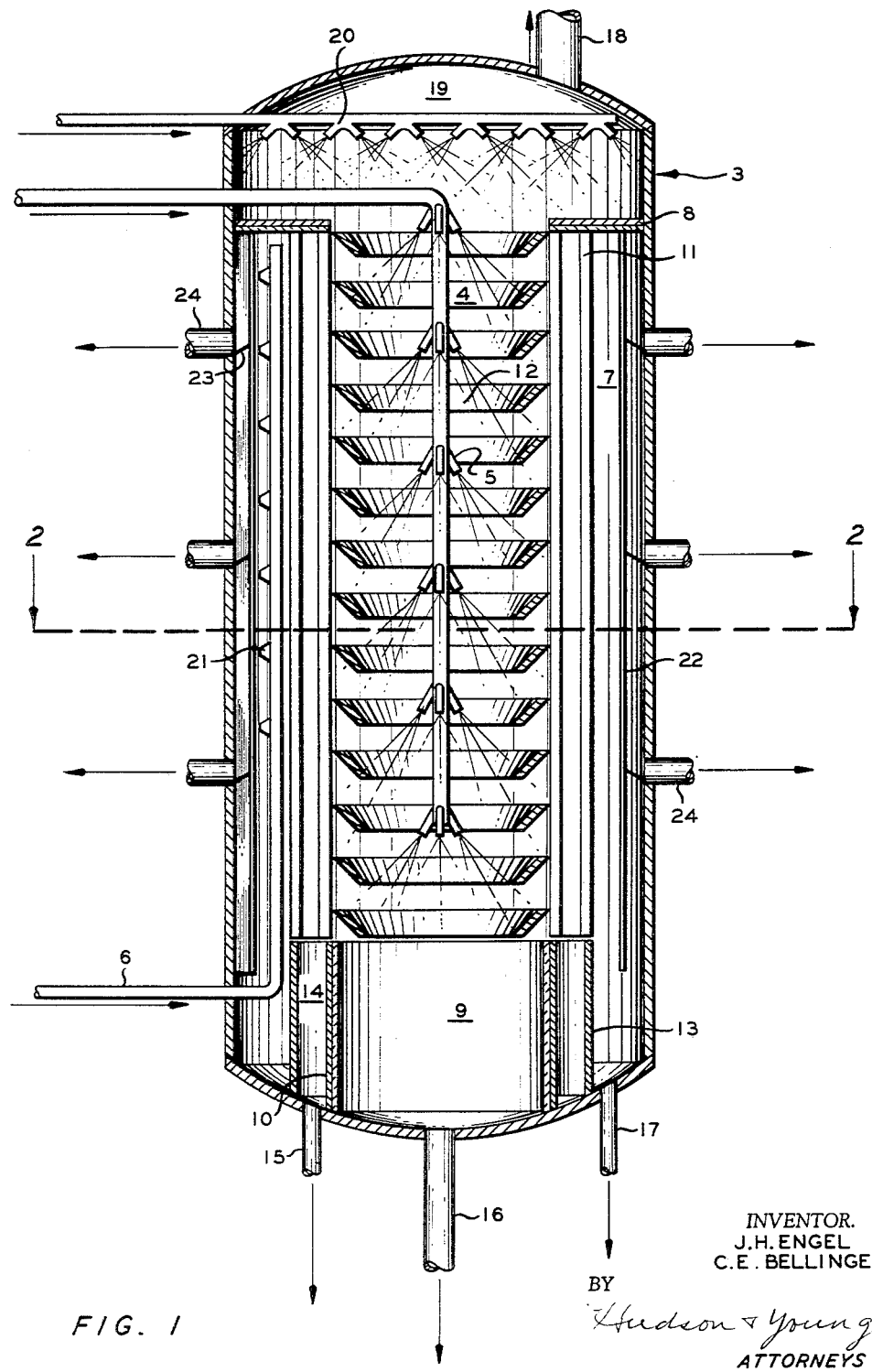

INVENTOR.
J. H. ENGEL
C. E. BELLINGER

May 31, 1960  J. H. ENGEL ET AL  2,938,866
DISTILLATION METHOD AND VESSEL
Filed April 25, 1957  2 Sheets-Sheet 2

INVENTORS
J. H. ENGEL
C. E. BELLINGER
BY
Hudson & Young
ATTORNEYS

United States Patent Office 2,938,866
Patented May 31, 1960

2,938,866
DISTILLATION METHOD AND VESSEL

John H. Engel and Carnot E. Bellinger, Sweeny, Tex., assignors to Phillips Petroleum Company, a corporation of Delaware Filed Apr. 25, 1957, Ser. No. 655,116

21 Claims. (Cl. 208—352)

This invention relates to distillation. In one of its aspects, it relates to a distillation method wherein a distilland is flashed in a peripheral section of a vertical zone substantially over the entire length thereof around a centrally disposed condensing zone separated from the flashing area or space by a liquid droplet flow-arresting or collecting zone surrounding said condensing zone. In another of its aspects, the invention relates to a substantially vertically disposed distillation vessel having a peripheral flash section and a central condensing section, said sections being separated by a liquid droplet flow-arresting partition or curtain, said zones and curtain extending substantially the entire length of the vessel, the flashing section being provided with distilland feeding means so constructed and arranged as to supply distilland substantially over the entire length of the flashing section to produce an inwardly flowing mass of vapors, flowing toward said central condensing section through said curtain, and means for maintaining separate in said flashing section non-vaporized residual liquid from condensate formed in said condensing section and means for separately withdrawing from each of said sections liquid accumulating therein. In a further aspect of the invention, it relates to a method as described wherein the distilland is fed onto the inner wall of the vessel as a plurality of films and wherein each film is substantially entirely removed from the wall of the vessel before it reaches a place at which another film is being placed thereon. In a further aspect of the invention, liquid flow-arresting means are provided along the inner wall of the vessel, which has been described, to act in conjunction with several feeding means to provide the said separate flowing films upon the inner wall of said vessel. In a further aspect, the invention relates to the use of a droplet flow-arresting zone wherein a centrifugal force is applied to said droplets.

It is well known that there are several major problems limiting yields in distillation methods and apparatus, particularly in vacuum flashing operations and apparatus. One of the major problems involves the adequate separation of liquid from the flashed vapors. Another of the problems involves the realization of minimum flash zone pressures. In the conventional horizontal or even vertical cylindrical vacuum flash towers, the flashed vapor flows a substantial distance from the flash zone to the condensing zone in a direction of flow which is normal to the vessel cross-sectional area. That is, the vapors are caused to flow axially in the vessel. The maximum quantity of total flashed vapor in the conventional vacuum flash tower is, therefore, limited by the cross-sectional area of the tower since flash zone pressure and the quantity of entrained liquid both will increase with increasing vapor velocity.

It is an object of the present invention to provide a novel distillation method. It is another object of this invention to provide a novel distillation apparatus or vessel. A further object of this invention is to provide a distillation method which permits an increase of the area normal to vapor flow without any increase in the distillation zone. A still further object of the invention is the provision of a tower design or construction which will permit the increase of the area normal to vapor flow without any increase in vessel size. Another object of the invention is to provide for improved operation of a distillation vessel wherein entrained liquid droplets of non-vaporized residual liquid are separated from vapor flow. A further object of the invention is to provide a method and apparatus wherein entrained liquid is separated from vapors by centrifugal force applied to vapors which otherwise are flowing at a relatively low rate of flow as compared with the rate of flow of vapors in present vessels of comparable overall size.

Other aspects, objects and additional advantages of the present invention are apparent from this disclosure, the drawing and the appended claims.

According to this invention, there is provided a method for distilling a distillable material which comprises providing the following zones: a vapor condensing zone, an entrained non-vaporized residue separation zone and a flashing zone, the separation zone surrounding the condensing zone and the flashing zone surrounding the separation zone, supplying to said flashing zone substantially throughout its extent a distillable material under flashing conditions so as to cause flashing of said material therein, forming vapors containing entrained non-vaporized residue, and residue, passing said vapors substantially horizontally through said separation zone into said condensing zone, in said condensing zone condensing said vapors, now freed from entrained residue, removing condensate thus obtained as a distillate of the method, removing the entrained liquid from said separation zone and removing unvaporized residue from said flashing zone.

Also, according to the present invention, there is provided a distillation apparatus comprising, in combination, a substantially vertically disposed elongated shell; within said shell, extending from near the bottom thereof nearly to the top end thereof, an elongated vapor permeable partition, adapted to arrest flow of and to remove droplets of entrained non-vaporized distilland residue from vapors passing therethrough, spaced from the wall of said shell surrounding a substantially elongated centrally positioned condensing section and providing between said shell and said partition a flashing section, feeding means for feeding distilland into said flashing section at a plurality of places so as to provide flashing distilland substantially completely over the entire length of said flashing section, a dam means extending from the bottom end of said partition to the bottom of said vessel to keep separated from each other condensed distillate and liquid in the bottom of said flashing section draining from said flashing section and from said partition, means for removing unvaporized residual distilland from said flashing section and means for removing condensed distillate from said condensing section.

The present invention in all of its aspects is applicable to the distillation of hydrocarbon oils, fruit juices, synthetic organic liquids, especially those which readily decompose, and is especially adapted for vacuum distillation in which the entrainment of non-vaporized residual droplets of liquid presents a problem. It will be obvious to one skilled in the art in possession of this disclosure that various other distillable materials can be distilled employing either the method or the apparatus of the invention, or both.

Figure 2:
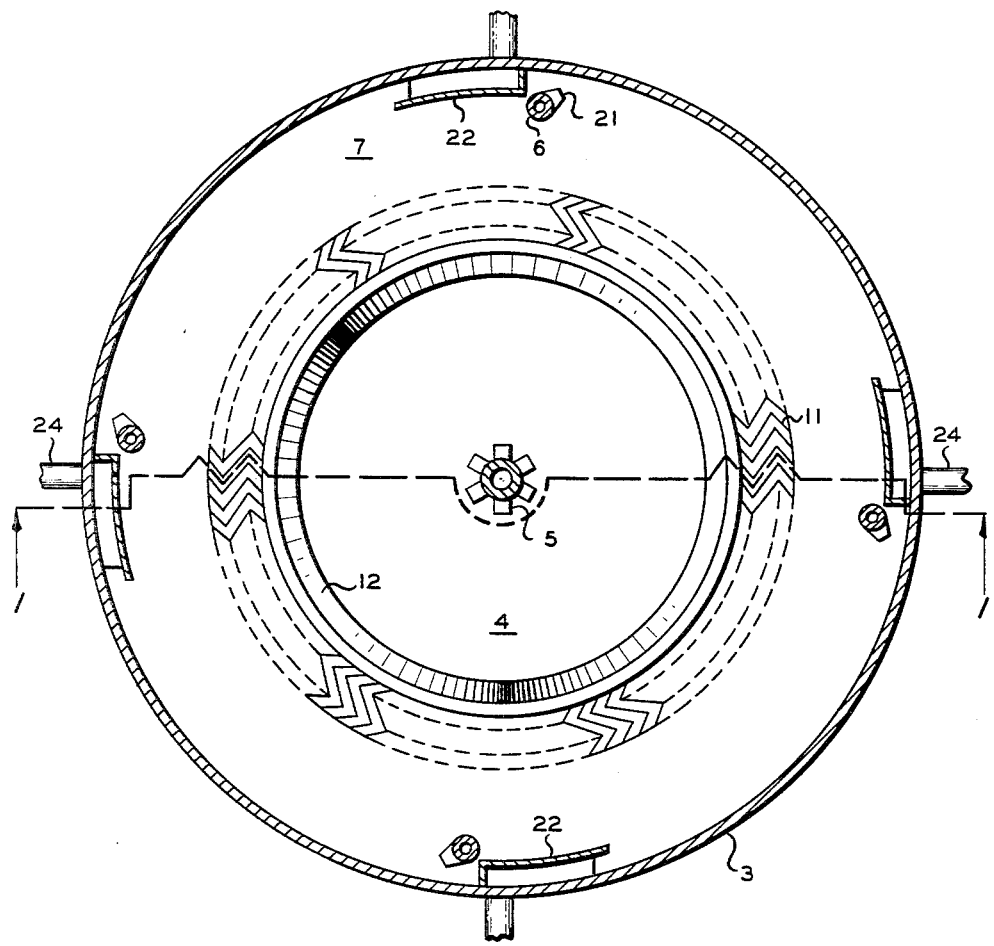

In Figure 1, there is shown an elevated cross-section of a distillation vessel according to the invention. In Figure 2, there is shown a cross-section taken at right angles to the axis of the vessel at line 2—2 of Figure 1.

Referring now to the drawings, there is provided in vessel 3 an inner axially disposed condensing section 4 in which are located condensing sprays 5. Feed to be distilled is fed by pipes 6, which can be nozzle equipped, into flashing section 7, preferably against the inner wall of vessel 3. The upper end of flashing section 7 is defined and closed by insulated partition 8. Condensing section 4 extends almost substantially the entire length of the vessel. At its bottom end, section 4 is provided with a condensate collection and removal section 9 which is defined by insulated wall 10 which separates portion 9 from the flashing section 7. In this embodiment, the condensing section is separated along its entire length from the flashing section by a concentrically disposed permeable barrier composed of angle iron baffles 11 and slanted splash rings 12. The baffles are substantially vertically disposed and at their bottom ends abut concentric ring 13 surrounding wall 10. There is thus provided a collection section 14 for collecting liquid which drains down from the ends of angle iron baffles 11. A knock-back or entrainment draw-off 15 is provided to remove liquid from section 14. Condensate is withdrawn from section 9 by way of pipe 16. Residue is removed from flashing section 7 by pipe 17. Vessel 3 is connected to a vacuum source by pipe 18. The upper section of vessel 3, denoted by 19, is provided with additional sprays 20 which insure that all condensible vapors are condensed to guard against entry of vapors into pipe 18. Returning now to feed pipes 6, it will be noted that these pipes are disposed peripherally around the inner side of the wall of vessel 3. These pipes are provided with nozzle 21 which direct the material to be distilled onto the wall of the vessel in a manner to cause the material to be spread out and to move around on said wall as a film. Substantially vertically disposed liquid traps 22 collect from the wall unvaporized liquid which is in one embodiment drained down to the foot of the vessel and is removed at 17. To better spread the liquid on the wall of the vessel, there are provided additional liquid collectors 23 which are disposed substantially horizontally around the inner wall of vessel 3 but which are preferably slanted toward draw-off pipes 24.

It will be seen that in operation, the distilland will be spread out upon the vessel wall, will move around it until removed therefrom, in this embodiment, immediately before additional distilland is directed onto the wall. Vapors formed will travel substantially horizontally through the angle irons into the condensing section and therein will be condensed. Condensate will be removed at 16. Non-condensibles, if any, will be removed at 18. Residual liquid will be removed at 17 and 24. Entrained liquid will be removed by the angle irons which will be maintained wetted by said entrained liquid. Further, as desired, angle irons are so shaped and arranged, as shown, as to cause a swirling motion of the vapors imparting to any entrained particles escaping through the irons a centrifugal force, thus, driving such particles back to the irons and ultimately out by draw-off 15, by draining from said irons.

While a plurality of evenly-spaced feed pipes, sprays, splash rings, traps, etc. have been shown in the drawing, it is clear that one skilled in the art in possession of this disclosure can differently arrange any one or more of such elements of the apparatus. For example, it is within the scope of the claimed invention to arrange it using a square or rectangular vessel. In such event, the condensing section will usually, though not necessarily, be similarly shaped. In a rectangular vessel, there can be more feed pipes along the long walls than along the short walls. Also, the feed pipes can be located only in the corners or only midway between them, etc., or following any desired combination here suggested to the mind of one skilled in this art. Especially when no separate liquid traps or collectors 23 are provided, somewhat less distilland can be introduced into lower portions of the flashing section than in the higher portions thereof to arrive at a more uniform flow of distilland film or residual material on the walls. In a large vessel, such control will aid in the control of vapor flow through the angle irons to make it more uniform.

The feed pipes 6 do not necessarily have to have nozzles 21 thereon. Instead, we may employ two or more apertures along the length of pipe with the apertures increasing in size in the direction of fluid flow through the pipe. The apertures are aligned along the length of the pipe to effect tangential flow of fluid onto the inner periphery of the wall of the vessel. Instead of a series of apertures, we may employ a single aperture in the form of a slit along the length of the feed pipe. This slit may advantageously be tapered with the opening increasing in size in the direction of flow of fluid through the pipe.

SPECIFIC EXAMPLE

In a specific operation of our invention, topped crude, produced by distilling Western Kansas crude, is charged via four feed pipes 6 after having been preheated to 725° F. The flash zone pressure is 2 mm. Hg, absolute. Residuum is withdrawn via line 17, condensate product by 16, and accumulated knock-back is periodically removed via line 15. A portion of the condensate is cooled and returned to the vacuum drum via spray nozzles 5 and 20 for condensing purposes. A portion of the residuum is reheated an introduced with the fresh feed for heating purposes.

*Data*

Vacuum vessel 3:
    Size, diameter x height, feet _____ 10 x 30
    Condensing zone, D x H, feet _____ 4 x 18
    Flash zone temperature, ° F. _____ 700
    Flash zone pressure, mm. Hg, abs. _____ 2
Fresh feed 6:
    Western Kansas topped crude, A.P.I. 60/60° F. _____ 17.5
    Preheat temperature, ° F. _____ 725
    Barrels/hour, total _____ 380
Residuum make 17:
    A.P.I. 60/60° F. _____ 9.7
    Penetration, 100 gms., 77° F., 5 sec. _____ 86
    Ductility, cm., 5 cm./min., 77° F. _____ 150+
    Barrels/hour _____ 184
Condensate make 16:
    A.P.I. 60/60° F. _____ 26.0
    NPA color, (undiluted) _____ 7
    Barrels/hour _____ [1] 194

[1] Loss of 2 barrels per hour to non-condensibles and to knock-back accumulation which is only periodically removed.

Various other charge materials may be processed in our apparatus including milk, citrus fruit juices (lemon, orange, lime, grapefruit), vegetable juices, inorganic chemical slurries, organic chemical solutions, etc.

Reasonable variation and modification are possible within the scope of the foregoing disclosure, drawing, and the appended claims to the invention, the essence of which is that there have been provided a method for the distillation of a distillable material comprising the steps of distributing such a material around the boundary of a substantially vertical flashing zone under distillation conditions over substantially the entire height thereof, passing vapors thus produced substantially horizontally into a substantially axially disposed condensing zone by way of a concentrically disposed entrainment separation zone, and in said zone condensing said vapors to obtain a clean condensate, a liquid flow of separated entrained material and a liquid residue; and an apparatus comprising a substantially vertically disposed elongated shell or vessel having substantially axially disposed therein a condensing section, defined by a substantially concentrically disposed entrainment separator defining an annular flashing section, said vessel having means therein for feeding distilland into said flashing section, preferably onto and around the outer wall or walls of said flashing section, and peripherally also having means to remove residue from said walls at spaced points along and/or around said wall or walls, means for withdrawing unvaporized residue, for withdrawing collected entrained liquid flowing from said entrainment separator, means for causing contact of vapor entering into said condensing section with a condensing liquid or equivalent means and means for withdrawing condensed liquid from said condensing section, substantially as set forth and herein described.

We claim:

1. A method for distilling a distillable material which comprises providing the following zones: a vapor condensing zone, an entrained non-vaporized residue separation zone and a flashing zone, the separation zone surrounding the condensing zone and the flashing zone surrounding the separation zone, supplying to said flashing zone, substantially throughout its extent, a distillable material under flashing conditions so as to cause flashing of said material therein, forming vapors containing entrained non-vaporized residue, and residue, passing said vapors substantially horizontally from all points in said flashing zone radially inwardly through said separation zone into said condensing zone, in said condensing zone, condensing said vapors, now freed from entrained residue, removing separately from said condensing zone condensate thus obtained as a distillate of the method, removing entrained liquid residue from said separation zone and removing unvaporized residue from said flashing zone.

2. A method for distilling a distillable material which comprises providing the following zones: an elongated substantially cylindrical and vertically disposed condensing zone, an entrained non-vaporized residue entrainment separation zone vertically disposed around said condensing zone and a flashing zone vertically disposed around said separation zone, supplying a distillable material peripherally into said flashing zone, substantially over the entire length of the boundaries thereof, under conditions to cause flashing of said material in said zone to form vapors containing unavoidably entrained non-vaporized liquid droplets, passing vapors thus formed substantially horizontally from all points in said flashing zone radially inwardly through said separation zone, thus, separating from said vapors said liquid droplets, into said condensing zone, in said condensing zone condensing said vapors now freed from said droplets and removing condensate thus obtained from said condensing zone.

3. A method for distilling a distillable liquid which comprises feeding said liquid under flashing conditions onto and substantially over the entire length of the outer peripheral boundary of a substantially vertical elongated annular flashing zone forming vapors containing entrained non-vaporized residual liquid and leaving at said boundary non-vaporized liquid which is collected and removed therefrom, passing said vapors substantially horizontally from all points in said flashing zone radially inwardly into an elongated entrainment separation zone, extending substantially the length of said flashing zone and surrounded by said flashing zone over substantially its entire length, said flashing zone forming the outer peripheral boundary of said separation zone, in said separation zone removing from said vapors the entrained non-vaporized residual liquid, from said separation zone passing said vapors into a condensing zone extending substantially the length of said separation zone and being substantially entirely surrounded by said separation zone over substantially its entire length, said separation zone forming the outer peripheral boundary of said condensing zone, in said condensing zone condensing said vapors to form a distillate and removing said distillate from said zone.

4. A method for distilling a distillable liquid which comprises feeding said liquid as a plurality of streams under vapor-forming conditions tangentially onto and substantially over the entire length of the outer peripheral boundary of a substantially vertical distillation zone, at spaced points around said boundary removing therefrom and from said zone liquid from one of said streams which has travelled along said boundary a distance sufficient to have permitted a substantial vaporization of its vaporizable components and before it reaches liquid from another of said streams, thus forming several substantially independent films of vaporizable liquid flowing around said boundary forming vapors containing entrained droplets of liquid, flowing said vapors substantially horizontally into an elongated substantially concentrically disposed entrainment separation zone, in said zone submitting said vapors to a centrifugal force and separating said entrained droplets of liquid therefrom, then passing said vapors into a condensing zone extending substantially the entire length of said separation zone and being substantially entirely surrounded over substantially its entire length by said separation zone, said separation zone forming the outer peripheral boundary of said condensing zone, in said condensing zone condensing said vapors by contacting the same with a plurality of sprays of a condensing liquid to form a distillate and removing said distillate from said zone.

5. A method according to claim 4 wherein liquid is removed from said boundary at spaced points along the length of said zone.

6. A method according to claim 4 wherein entrained liquid removed from the vapors in the separation zone is separately collected at the bottom of said zone and removed from the distillation zone.

7. A method according to claim 4 wherein in said condensing zone at the periphery thereof and substantially along the entire length thereof there is provided a condensing spray deflecting zone.

8. A method according to claim 4 wherein at the upper end of said distillation zone there is provided a source of vacuum and wherein in line of flow of vapors toward said source there is provided a cooling spray zone to guard against loss of distillate to said vacuum source.

9. A distillation apparatus comprising, in combination, a substantially vertically disposed elongated shell, within said shell, extending from near the bottom thereof nearly to the top end thereof, an elongated vapor permeable partition, adapted to arrest flow of and to remove droplets of entrained non-vaporized distilland residue from vapors passing therethrough, spaced from the wall of said shell surrounding a substantially elongated centrally positioned condensing section and providing between said shell and said partition a flashing section, condensing means within said condensing section, feeding means for feeding distilland into said flashing section at a plurality of places and at a plurality of levels so as to provide flashing distilland substantially completely over the entire length of said flashing section, a dam means extending from the bottom end of said partition to the bottom of said vessel to keep separated from each other condensed distillate and liquid in the bottom of said flashing section draining from said flashing section and from said partition, means for removing unvaporized residual distilland from said flashing section, and means for separately removing condensed distillate from said condensing section.

10. A distillation apparatus comprising, in combination, a substantially vertically disposed elongated vessel, within said vessel, extending from near the bottom thereof of nearly to the top thereof, an elongated vapor permeable entrained liquid droplet deflecting and removing section spaced from the wall of said shell and substantially vertically surrounding a substantially elongated centrally positioned condensing section substantially coextending with said removing section and providing between said removing section and said vessel wall a flashing section also substantially coextending with said removing section, condensing means within said condensing section, partition means enclosing the top of said flashing section, dam means extending from the bottom of said section to the bottom of said vessel to prevent admixture of condensate in said condensing section with non-vaporized liquid in the bottom of said flashing section and draining from said removal section, means in said flashing section for feeding distilland into said flashing section at a plurality of places and levels so as to provide flashing distilland substantially at all levels of the length of said flashing zone, means for removing non-vaporized distilland and collected entrained droplets removed from the vapors from said flashing zone and means for removing condensed distillate from said condensing zone.

11. An apparatus according to claim 10 wherein said means in said flashing section for feeding distilland into said flashing section comprises a plurality of pipes extending substantially the length of said flashing section and wherein each of said pipes has a plurality of discharge openings along the length thereof.

12. An apparatus according to claim 11 wherein said discharge openings are arranged to discharge the distilland onto the inside of the vessel wall substantially parallel thereto so as to cause the liquid to travel along said wall as a film and wherein intermediate each of said pipes there is provided a film flow-arresting means which is adapted to prevent film resulting from at least one pipe discharge opening from flowing into the film resulting from an adjacent discharge opening.

13. An apparatus according to claim 12 wherein there is provided on the inner wall of said vessel film flow-arresting means extending substantially axially the length of said flashing section and positioned between said pipes so as to prevent film resulting from one of said pipes from reaching film resulting from an adjacent pipe.

14. An apparatus according to claim 12 wherein there is provided on the wall of said vessel film flow-arresting means extending substantially horizontally around the inner wall of said vessel so as to prevent film resulting from a pipe discharge opening from flowing downwardly into a film resulting from another pipe discharge opening and wherein there are provided means for removing liquid collecting at said film flow-arresting means.

15. A distillation vessel comprising a substantially upright elongated cylindrical shell, a substantially cylindrica vapor permeable entrained liquid droplet flow-arresting partition means disposed substantially concentrically in said vessel and extending from near the bottom to near the top of said vessel, forming a substantially annular flashing section and a central section which sections are substantially coextensive with said partition means, a partition closing the top of said flashing section, a partition extending from the bottom end of said droplet flow-arresting partition means to the bottom of said vessel, separating said flashing section and said central section from each other, means for introducing distilland into said flashing section at several levels substantially over its entire length and around the periphery of said annular flashing section, condensing means within said central section over a substantial length thereof for condensing vapors entering the same, means for withdrawing non-vaporized residue from the bottom of said flashing section, and means for withdrawing condensate from said central section.

16. A vessel according to claim 15 wherein the droplet flow-arresting means has a substantial thickness at right angles to the axis of the vessel, there are two partitions extending from the bottom thereof to the bottom of the vessel, one of said two partitions being at the inner periphery of said arresting means and the other at the outer periphery of said arresting means and wherein a pipe is provided for withdrawing from between said partitions accumulated entrained liquid flowing down between said partitions from said arresting means.

17. An apparatus according to claim 16 wherein the condensing means is composed of a plurality of sprays positioned substantially throughout the length of said central section, there is a connection to a source of vacuum at the top of the vessel, a plurality of sprays is disposed in the top of the vessel to guard against distillate leaving the same through said connection, the flow-arresting partition means is composed of angle irons of identical shape, providing a tortuous path ending at an angle to the diameter of the central section to provide a swirling motion to vapors going therethrough into said central section, and there are provided splash rings at several levels positioned to prevent spray from said sprays disposed in said central section from substantially impinging upon said flow-arresting means.

18. A method for distilling a distillable material which comprises providing the following zones: a vapor-condensing zone, an entrained non-vaporized residue separation zone and a flashing zone, the separation zone surrounding the condensing zone and the flashing zone surrounding the separation zone, supplying to said flashing zone, substantially simultaneously and throughout its extent, a distillable material under flashing conditions so as to cause flashing of said material therein, forming vapors containing entrained and non-vaporized residue, and residue, passing said vapors substantially horizontally into said separation zone, in said separation zone subjecting said vapors to a centrifugal force, thus removing entrained non-vaporized residue and preventing the same from passing into the condensing zone, passing vapors thus freed from non-vaporized residue into said condensing zone, condensing said vapors in said condensing zone, removing condensate thus obtained as a distillate of the method, separately removing entrained liquid from said separation zone and removing unvaporized residue from said flashing zone.

19. A method for distilling a hydrocarbon oil which comprises providing the following zones: a vapor-condensing zone, an entrained non-vaporized heavy oil residue separation zone and a flashing zone, the separation zone surrounding the condensing zone and the flashing zone surrounding the separation zone, supplying to said flashing zone, substantially simultaneously and throughout its extent, said oil under flashing conditions of temperature and pressure so as to cause flashing of said oil therein, forming oil vapors containing entrained non-vaporized heavy oil residue, and heavy oil residue, passing said vapors substantially horizontally through said separation zone into said condensing zone, in said condensing zone, condensing said oil vapors, now freed from entrained heavy oil residue, removing condensate thus obtained as a distillate of the method, removing entrained heavy oil liquid from said separation zone as a separate stream and removing unvaporized residue from said flashing zone.

20. A method for distilling a distillable liquid which comprises feeding said liquid as a plurality of streams under vapor-forming conditions tangentially onto and substantially over the entire length of the outer peripheral boundary of a substantially vertical distillation zone, at spaced points around said boundary removing therefrom and from said zone liquid from one of said streams which has travelled along said boundary a distance sufficient to have permitted a substantial vaporization of its vaporizable components and before it reaches liquid from another of said streams, thus forming several substantially independent films of vaporizable liquid flowing around said boundary forming vapors containing entrained droplets of liquid, flowing said vapors substantially horizontally into and through an elongated substantially concentrically disposed entrainment separation zone, in said zone separating said entrained droplets of liquid from said vapors, then passing said vapors into a condensing zone extending substantially the entire length of said separation zone and being substantially entirely surrounded over substantially its entire length by said separation zone, said separation zone forming the outer peripheral boundary of said condensing zone, in said condensing zone condensing said vapors by contacting the same with a plurality of sprays of a condensing liquid to form a distillate and removing said distillate from said zone.

21. An apparatus according to claim 16 wherein the condensing means is composed of a plurality of sprays axially positioned at a plurality of levels substantially throughout the length of said central section each of the sprays being oriented radially outwardly and downwardly, there is a connection to a source of vacuum at the top of the vessel, a plurality of sprays is disposed in the top of the vessel to guard against distillate leaving the same through said connection, the flow-arresting partition means is composed of angle irons of identical shape, providing a tortuous path ending at an angle to the diameter of the central section to provide a swirling motion to vapors going therethrough into said central section, and there are provided splash rings at several levels positioned to intercept and to prevent spray from said sprays disposed in said central section from substantially impinging upon said flow-arresting means.

References Cited in the file of this patent

UNITED STATES PATENTS

| | | |
|---|---|---|
| 552,456 | Theisen | Dec. 31, 1895 |
| 888,119 | Richards | May 19, 1908 |
| 1,870,193 | Grahame | Aug. 2, 1932 |
| 2,180,052 | Hickman et al. | Nov. 14, 1939 |
| 2,779,724 | Dunning et al. | Jan. 29, 1957 |
| 2,793,174 | Smith | May 21, 1957 |
| 2,803,589 | Thomas | Aug. 20, 1957 |
| 2,843,534 | Harper | July 15, 1958 |